US010761696B2

(12) United States Patent
Sahai et al.

(10) Patent No.: US 10,761,696 B2
(45) Date of Patent: Sep. 1, 2020

(54) SYSTEM AND METHOD FOR DEVICE ADDRESS ASSIGNMENT IN AN ALARM SYSTEM USING INTERACTIVE ADDRESS ASSIGNMENT FOR FASTER COMMISSIONING

(71) Applicant: HONEYWELL INTERNATIONAL INC., Morris Plains, NJ (US)

(72) Inventors: Deepika Sahai, Morris Plains, NJ (US); Narendra Chandrakant Salve, Morris Plains, NJ (US); Srivatsa Haridas, Morris Plains, NJ (US); Kamalraja Ganesan, Morris Plains, NJ (US); Adithya Holehonnur, Morris Plains, NJ (US)

(73) Assignee: Honeywell International Inc., Morris Plains, NJ (US)

( * ) Notice: Subject to any disclaimer, the term of this patent is extended or adjusted under 35 U.S.C. 154(b) by 0 days.

(21) Appl. No.: 16/508,618

(22) Filed: Jul. 11, 2019

(65) Prior Publication Data
US 2020/0019287 A1   Jan. 16, 2020

(30) Foreign Application Priority Data
Jul. 11, 2018 (EP) ................................. 18182879

(51) Int. Cl.
*G06F 3/048* (2013.01)
*G06F 3/0484* (2013.01)
(Continued)

(52) U.S. Cl.
CPC ........ *G06F 3/0484* (2013.01); *H04L 61/2092* (2013.01); *G08B 17/00* (2013.01)

(58) Field of Classification Search
None
See application file for complete search history.

(56) References Cited

U.S. PATENT DOCUMENTS

| 2014/0267112 A1* | 9/2014 | Dunn | G06F 3/0416 345/173 |
| 2016/0148498 A1* | 5/2016 | Ruszala | G06F 3/04842 340/506 |
| 2020/0066125 A1* | 2/2020 | Boguslawski | G08B 25/085 |

OTHER PUBLICATIONS

Socrates Varakliotis et al., The User of Handle to Aid IoT Security, Jun. 1, 2015, IEEE ICC 2015 SAC—Internet of Things, 542-548 (Year: 2015).*

(Continued)

*Primary Examiner* — Tam T Tran
(74) *Attorney, Agent, or Firm* — Brooks, Cameron & Huebsch, PLLC

(57) ABSTRACT

The Commissioning phase is usually the most Time/Labor intensive phase in the Fire Safety System life cycle as the process involves referring to the Building floor plan document (as provided by the Installer) and creation of Areas/Zones and carefully assigning each fire device (viz. Smoke/Heat detectors, MCP etc.) to the corresponding zones in the Panel configuration software to configure the Fire Panel. The overall process easily spans for multiple days based on the Building network complexity. The present invention provides a system, apparatus and method for rapid commissioning by providing a graphical interface in which device addresses can be uniquely allocated using an interactive screen. This avoids double address faults which can be time consuming to identify and rectify. Geographic information of the devices can also be identified and incorporated using the interactive screen.

15 Claims, 10 Drawing Sheets

(51) Int. Cl.
*H04L 29/12* (2006.01)
*G08B 17/00* (2006.01)

(56) References Cited

OTHER PUBLICATIONS

Amin Hassanzadeh et al., Towards Effective Security Control Assignment in the Industrial Internet of Things, Dec. 1, 2015, IEEE, pp. 1-6 (Year: 2015).*

* cited by examiner

Figure 2

Add Devices — 240

Select Device Type

🔍 Search devices — 242

Sensors: 20 Devices

- Heat Detector Rate of Rise ▸
- Wireless Optical Smoke Detector
- Wireless Heat Detector 58°C Fixed Temperature
- SMART4™ Multi Criteria Detector
- Heat Detector 58°C Fixed Temperature

144

Select address you want to add in selected device — 244

`8,9,13,17,18,25,28`    Clear All

Sensors | Modules — 246

Available ☐  Selected ☐ Occupied — 250

▦ | ⚏

248

| 1 | 2 | 3 | 4 | 5 | 6 | 7 | 8 | 9 | 10 | 11 | 12 | 13 | 14 |
|---|---|---|---|---|---|---|---|---|----|----|----|----|----|
| 15 | 16 | 17 | 18 | 19 | 20 | 21 | 22 | 23 | 24 | 25 | 26 | 27 | 28 |
| 29 | 30 | 31 | 32 | 33 | 34 | 35 | 36 | 37 | 38 | 39 | 40 | 41 | 42 |
| 43 | 44 | 45 | 46 | 47 | 48 | 49 | 50 | 51 | 52 | 53 | 54 | 55 | 56 |

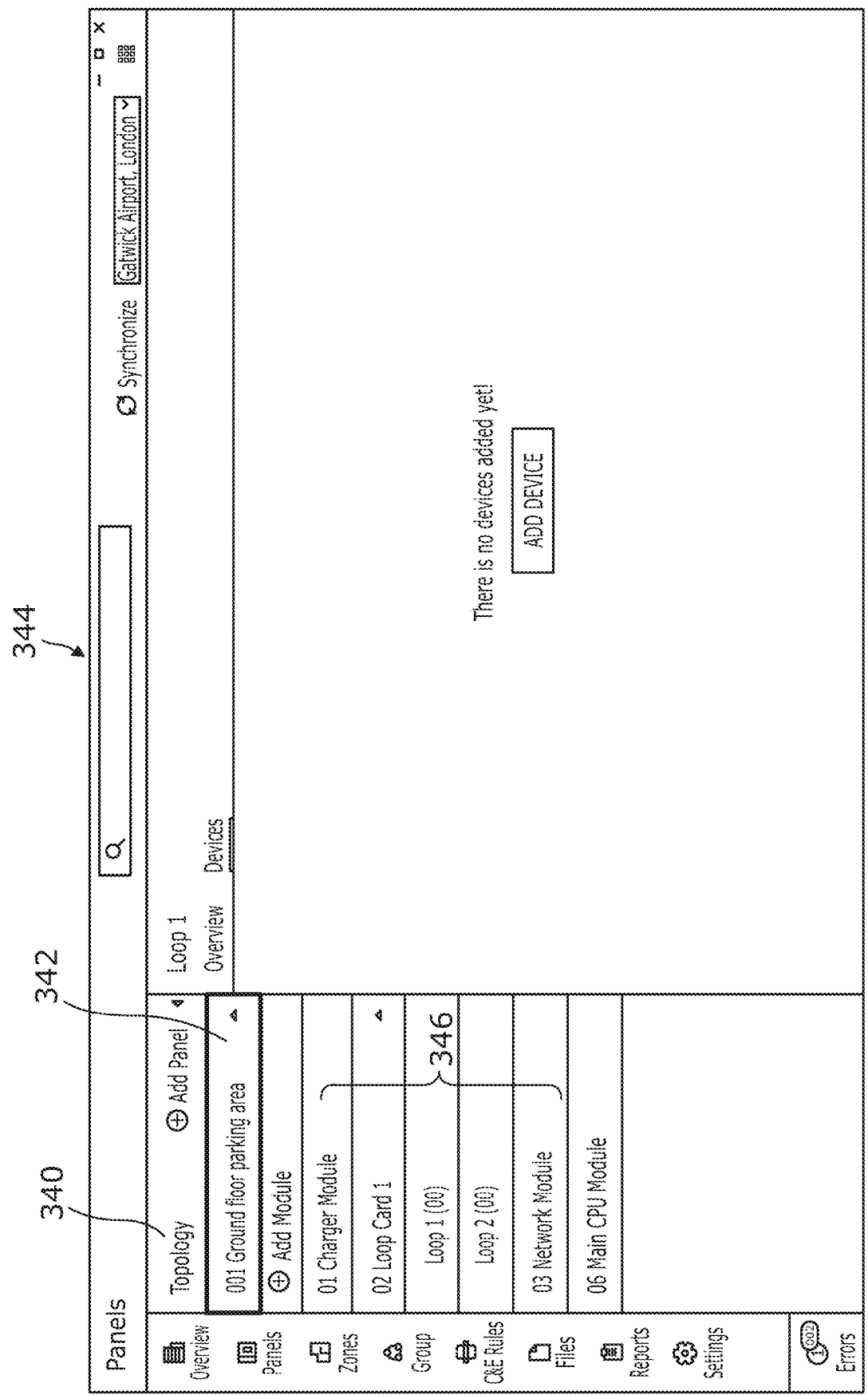
Figure 3 - Step 1

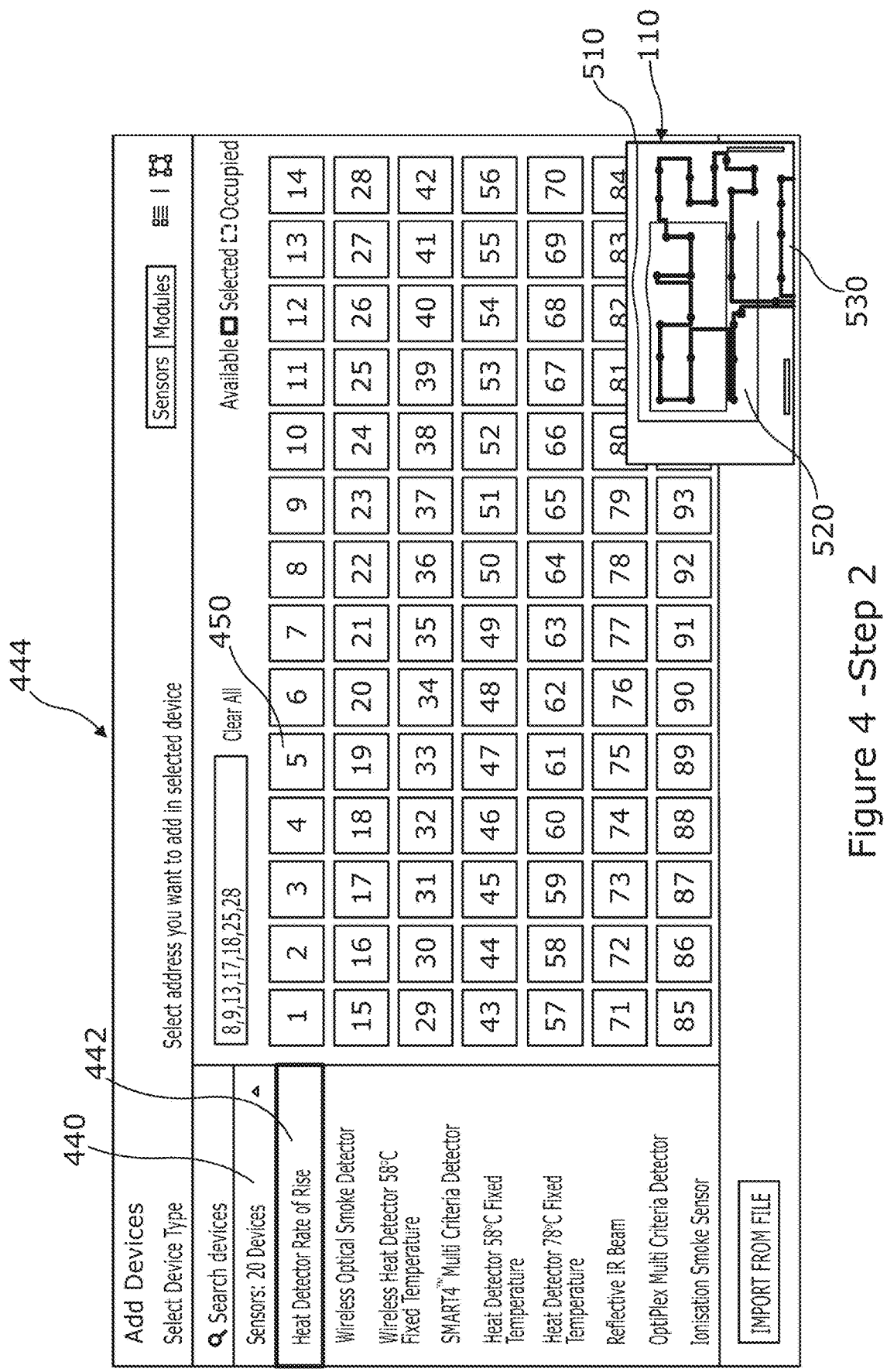
Figure 4 - Step 2

Figure 5 - Step 3

Figure 6 - Step 4

Figure 7 - Step 5

Figure 8 – Step 6

SYSTEM AND METHOD FOR DEVICE ADDRESS ASSIGNMENT IN AN ALARM SYSTEM USING INTERACTIVE ADDRESS ASSIGNMENT FOR FASTER COMMISSIONING

CROSS-REFERENCE TO RELATED APPLICATIONS

This application claims the benefit of European Patent Application No. 18182879.9 filed Jul. 11, 2018, the disclosure of which is herein incorporated by reference in its entirety.

The present invention relates to a system and method for device address assignment in an alarm system, such as a fire alarm system using interactive address assignment for faster commissioning. This is in the technical field of fire systems and more particularly the activation of sensor, detector and warning devices in a fire system.

BACKGROUND

Alarm systems, such as fire detection systems are generally known. Such systems are typically based upon the use of a number of peripheral devices, zo such as fire detectors or proximity detectors, dispersed throughout a building, and at least one warning device that alerts occupants of the building to the presence of a fire. While each fire detector could be connected to its own warning device, fire detectors are typically connected to a common monitoring panel. This is useful because of the need to send notice of any detected fire to a central monitoring station. The often referred to as a control panel, may be linked to higher level systems such as to a fire department computer or central monitoring station.

The use of a common monitoring panel requires that a connection be established and maintained between the panel and each fire detector and each warning device. In the past, the connection was established by installing at least two wires between each fire detector and the monitoring panel and between each warning device and the monitoring panel. This provided a direct physical connection for each device to the common monitoring panel.

More recent systems have relied upon physical bus systems to connect devices to the central monitoring panel and/or radio systems where data signals rather than specific wires are used to identify peripheral devices when commissioning a system.

Whichever type of central monitoring panel system is employed there remains a fundamental and time-consuming issue on installation and commissioning, this is the need to give the signals from peripheral devices feeding into a control system an identified meaning. Commissioning is the activity of converting installed hardware into a functioning system to perform a given task, such as fire detection and reporting or intruder detection and reporting.

To illustrate the commissioning issue an incoming peripheral device signal in an installed system may be on, say, inputs 1 of 16 in the control panel but the relevance of the signal on this basis alone is limited. This is made more complex with bus systems where devices may each report on a common bus using a multidigit identification code. As such an incoming signal may indicate, for example, that smoke has been detected, but where is another matter. Methods of overcoming this can be to visit each peripheral and manually record its complex identifier so that it can be recognised and the given a meaning in the central monitoring panel such as by means of allocating a system address, alternatively meanings can be assigned at the central monitoring panel level and each peripheral can be re-assigned an identifier. The larger the installation the more significant is the requirement to identify which device may be providing a signal to a central monitoring panel or may require reception of a signal from a central monitoring panel.

Whatever the activation process by which a peripheral is integrated in a way that gives its communications meaning in an alarm system, the activation is complex and hence with current methods time consuming and error prone. Common errors are the assigning of more than one identifier or address to a given peripheral and/or assigning the same address to multiple peripherals. These errors can be hard to detect and time consuming to rectify. What is needed is, to an end user, a less complex system, apparatus and method for activating peripherals in an alarm system. An end user in this context is a commissioning engineer who transforms an installed set of hardware into a functioning alarm system.

THE INVENTION

The present invention provides:
An alarm system installed in a region to be monitored, the alarm system comprising: a central monitoring panel,
 the panel having a graphical interface for displaying and optionally inputting information,
a plurality of peripheral devices in communication with the panel;
 the devices being in a plurality of locations in the region;
  each device being identified by the central monitoring panel by means of an identifier with respect to its location,
the panel being configured to communicate the status of one or more of the devices, such as to a user of the control panel or to a central monitoring station for the purpose of providing alarm system functionality and
wherein the location of the devices in the region is provided on a plan; characterised in that:
 the graphical interface is configured to provide a display of the devices and their status, such as whether they are in communication with the panel and if they are providing an alarm or proving a signal indicating a user has prompted the device to provide a test signal;
 the graphical interface being further configured to enable a user to associate devices when displayed graphical interface with devices on the plan so as to activate the functionality of the device in the alarm system so as to display device activity (such as an alarm or test signal) information with respect to the device location on the plan.

The Commissioning phase is usually the most Time/Labor intensive phase in the Fire Safety System life cycle as the process involves referring to the Building floor plan document (as provided by the Installer) and creation of Areas/Zones and carefully assigning each device (viz. Smoke/Heat detectors, MCP etc.) to the corresponding zones in the Panel configuration software to configure the control panel. The overall process easily spans multiple days based on the Building network complexity. The present invention has the advantage that it allows this process to be carried out interactively in a graphical interface and greatly speeds up commissioning. This is in contrast to current systems where there is no standard method that allows a Commissioning Engineer to quickly assign device addresses to all the devices involved in the fire system network.

In the present invention the alarm system may be a fire alarm system or a security alarm system or a combined system. A fire alarm system is preferred as this provides a wide variety of device sensor types and a high likelihood of confusion with more evident safety implications if incorrectly configured. For example, incorrect commissioning may allocate an alarm device location in an incorrect location and the location of a fire. Similarly with a warning device, where an alert signal may be provided in the wrong part of a building when the signal from the device is allocated to an incorrect part of the plan. The alarm system of the present invention may be installed in a region to be monitored, that is a defined geographic region, for example within a given building or geographic location not extending beyond tens of meters.

In the present invention a control panel is preferably (micro) computer-controlled equipment which acts as a hub for processing signals to and from, i.e. communicating with, peripheral, devices for the purposes of controlling and monitoring the alarm system.

In the present invention the graphical interface may be provided by an attached computer, such as a laptop, by a separate visual display unit provided with suitable signals by the panel, or most preferably by a visual display unit integrated within the panel itself. This has the advantage that the configuration display set on commissioning can be seen directly by an end user when trying to identify in which part of the region, as identifiable on the plan (110, 510), for example which room in a building, a given peripheral device has been activated.

In the present invention a peripheral device is a device which provides localised functions for an alarm system. Such localised functions include detector functions such as: smoke detectors, heat detectors, glass break detectors, movement detectors, proximity sensors. Such localised functions include output functions such as: lighting, combustion suppression and alarm functions.

The status of a peripheral device refers to whether it is actively or passively performing its function, for example, whether a smoke detector is detecting smoke, sending a test signal or is waiting to detect smoke or whether an annunciator is sending out a message or waiting to send out a message. Device activity information refers to which of these activities is being performed or whether the device is, for the purposes of the panel, non-functional, i.e. an indication of inactivity or unrecognized signal output, such an unrecognised status code for a given type of device.

In the present invention a plan refers to a depiction of a geographic area such as in the form of a map. The plan is preferably displayed on the graphical interface. The plan will typically be prepared using architectural drawings, such as provided as a BIM, or by mapping out a building so as to provide a two or three-dimensional depiction of the region. A three-dimensional depiction is preferred as this helps remove confusion on commissioning since a device attached to a wall or floor is unlikely to be a smoke alarm and a device attached to a floor is unlikely to be a door- or window-opening alarm, as examples. This helps identify errors quickly.

The present standard process involves adding a list of fire devices (Sensors/Modules) followed by assigning of device address for each of those devices added. In this approach, there is always a possibility of assigning duplicate address to a fire device (Sensor/Module) due to human error. Therefore, the present invention in providing a display of the devices preferably only displays each device once and does not permit duplication and in particular does not allow address duplication.

The present invention allows the Commissioning Engineer to refer to the devices on the digital/physical building floor plan to easily assign a device address based on the intended assignment of meaning to the device function in the system and preferably also the assignment of a device address in association with a device marked/assigned on the plan, and most preferably such that device status is indicated on a graphical interface representation (510) of the plan so that its location can be confirmed on commissioning and the geographic location of its activity can be readily assimilated, such as in an emergency situation. To this end, device status is indicated on a graphical interface representation (510) of the plan is preferably be means of a graphic at a position on the plan which represents the device location in the region presented on the plan.

The interactive screen of the graphical interface preferably displays the available device addresses in the alarm system in the form of a grid view. From this the Commissioning Engineer can assign a required (for example an easily assimilated number, device address by simultaneously referring to the (floor) plan depicting installed devices. For example, the engineer may tap a series of available addresses shown on the interactive screen to allocate those addresses to a list or category of devices also displayed in the screen. Those address will then be associated with the devices and no longer be available for association with other devices. Similar actions with keyboard, mouse, trackball or cursor and options, if less preferred.

Preferably this assignment process involves the Engineer making the device produce a test signal, preferably by the engineer being physically located with the graphical interface proximate the device. The plan is preferably also displayed on the interactive screen of the graphical interface and associations are made between the device addresses and the peripheral devices at plan locations by means of dragging and dropping identifiers for those items, wherein the system then forms an association between the items for the purpose of providing alarm system functionality. Tapping the a. display or clicking a mouse are also option. For example, should an alarm signal be received using a given device address then an alarm indicium may be displayed on the control panel so as to geographically locate the source of the alarm for the commissioning engineer or an eventual end user to see.

In the present invention systems and methods disclosed herein can retrieve building information modelling data for a region from an industrial foundation classes (IFC) file and can load the corresponding building information modelling file or the floor plan of the region referenced therein onto the control panel graphical interface or separate graphical interface—to serve as the plan of the present invention, preferably where the graphical interface is a user's mobile device or a mobile application running thereon. The building information modelling data can include metadata for devices installed in the region and architectural and construction details of the region. Systems and methods disclosed herein can also identify a user's (such as the commissioning engineer holding the graphical interface in the form of a portable device in radio communication with the panel) current location from a compass or magnetometer sensor of the mobile device, receive user input identifying configuration data for the one or more devices in the region, such as the address or simply aest signal of the one or more devices, collect magnetic sensor location data or global positioning system data to wirelessly locate one or more devices in the region based on geo-magnetic positioning or global positioning, map all of the collected and received data to the building information modelling file or the floor plan to create the three-dimensional floor map of the region that identifies the location of the devices in the region, and store the building information modelling file or the floor plan with the mapped data thereon in a memory device either locally on the graphical interface device or remotely on a cloud system or a cloud server. The is enables a user with the graphical interface, when in a mobile format (140,142) to physically navigate the region to view and interact with devices, such as to provide test signals.

Once the data acquisition process is complete or whilst it is ongoing, systems and methods disclosed herein can receive via the graphical interface input from a user to associate a detected position of a device with an address. Preferably this occurs by activation of a device, the device then being recognised by the control panel and then automatically associated with a position on the plan corresponding to the position of the data acquisition device. Therefore, a Commissioning Engineer, on walking through an installation, for example room to room, can identify individual devices and automatically, or by manual selection, associate those devices with an address of the device which is recognised by the control panel. This greatly facilitates commissioning and in particular reduces mistakes as the complex address of a device can be automatically presented to a user either for further automatic association with a geographic position or by selective association by user input simply by the user walking through the building for the data acquisition device, such as a laptop computer or mobile phone with suitable app acting as the graphical interface of the invention.

Whilst the system may be preferably automatic in situations where a plurality of devices is identified in a given room (such as identified by the building information model file) user input may be prompted to resolve potential ambiguities. In addition, or in the alternative, when geo-magnetic positioning or global positioning (GPS) data have high degrees of error, i.e. show an error beyond the threshold, such as variations of more than 2 m from a predicted location (for example where they would indicate that the user is standing in the middle of a wall) then the user can also be prompted to resolve potential ambiguities and manually associate the device address displayed on the graphical interface with a given plan position.

For example, systems and methods disclosed herein can generate and display on a user interface of the mobile device a list of devices which have been detected by the control panel, receive user input to select one of the devices on the list, generate and display on the user interface of the mobile device an interactive three-dimensional floor map that identifies the location of the device with the address, and generate and output visual guidance on the interactive three-dimensional floor map to assist the user in navigating from the current location to the selected one of the device, for example, by displaying on the interactive three-dimensional floor map clear visual signs identifying the devices having a given status, thereby saving the user time in locating the devices. This greatly speeds up navigation by a commissioning engineer of an unfamiliar building and the location of a device, which may be relatively small compared to the size of a room, which particularly when under construction they have much wiring and many devices visually evident. In addition, systems and methods disclosed herein can also generate and display on the user interface of the mobile device a list of valid addresses that can be assigned to the selected one of the devices but no allow an given address to be associated with more than one device so as to avoid the established problem of double address faults, for example, by identifying all available valid addresses for the selected one of the devices based on the position of the selected one of the devices in a loop network of which the selected one of the devices is a part and optionally do so showing their position on the plan.

It is to be understood that the devices as disclosed and described herein can include devices that are part of an alarm system such: as a fire alarm system, having devices such as smoke or heat detectors, a strobe device, a manual call point, anunciators, and any relevant IoT devices; or as a security alarm system, having devices such as glass beak detectors, door and window opening detectors PIR devices, alarms and any relevant IoT devices; as would be understood by one of ordinary skill in the art as part of such alarm systems.

In accordance with disclosed embodiments, systems and methods disclosed herein can use geo-magnetic positioning or global positioning system reading to provide the user with the accurate location of the devices with accuracy of less than, for example, 2 meters. For example, systems and methods disclosed herein can collect magnetic sensor data to identify a unique magnetic fingerprint associated with a device in a region and map the pattern, that is, the geo-magnetic position, to a building information model (BIM) file or a floor plan of the region to identify the location of the device in the region. Furthermore, the location of the devices can be digitally stored in a memory device, either locally on the mobile device or remotely on a cloud system or a cloud server so that the location can be recalled on demand and relied upon for location accuracy. This is particularly useful when the plan in electronic form, such as suitable for display (510) is communicated showing relevant graphics/indicia to a central control panel or fire service to which the system can be attached. This rapidly allows support personal, such as firefighters to understand the location and extent of alert as well as the plan, such a floor plan of a building. Communication may be automatic and in an established graphical format such as pdf, tiff, jpeg format, the communication may be by e-mail, using established communication routes and sources increased compatibility with existing external systems.

The control panel may be coupled to the devices via a number of communication media. For example, the control panel may be connected to at least some devices, such as sensors, enunciators and warning devices via a wired communication loop and a corresponding communication module. Similarly, the control panel may be coupled to other sensor devices, via a communication loop, one or more gateways and a mesh network, with related radio communication.

DETAILED DESCRIPTION

The present invention will now be illustrated further with reference to the following drawings in which:

FIG. 2 shows an example graphical interface used in the present invention for identifying devices;

Figure 6:
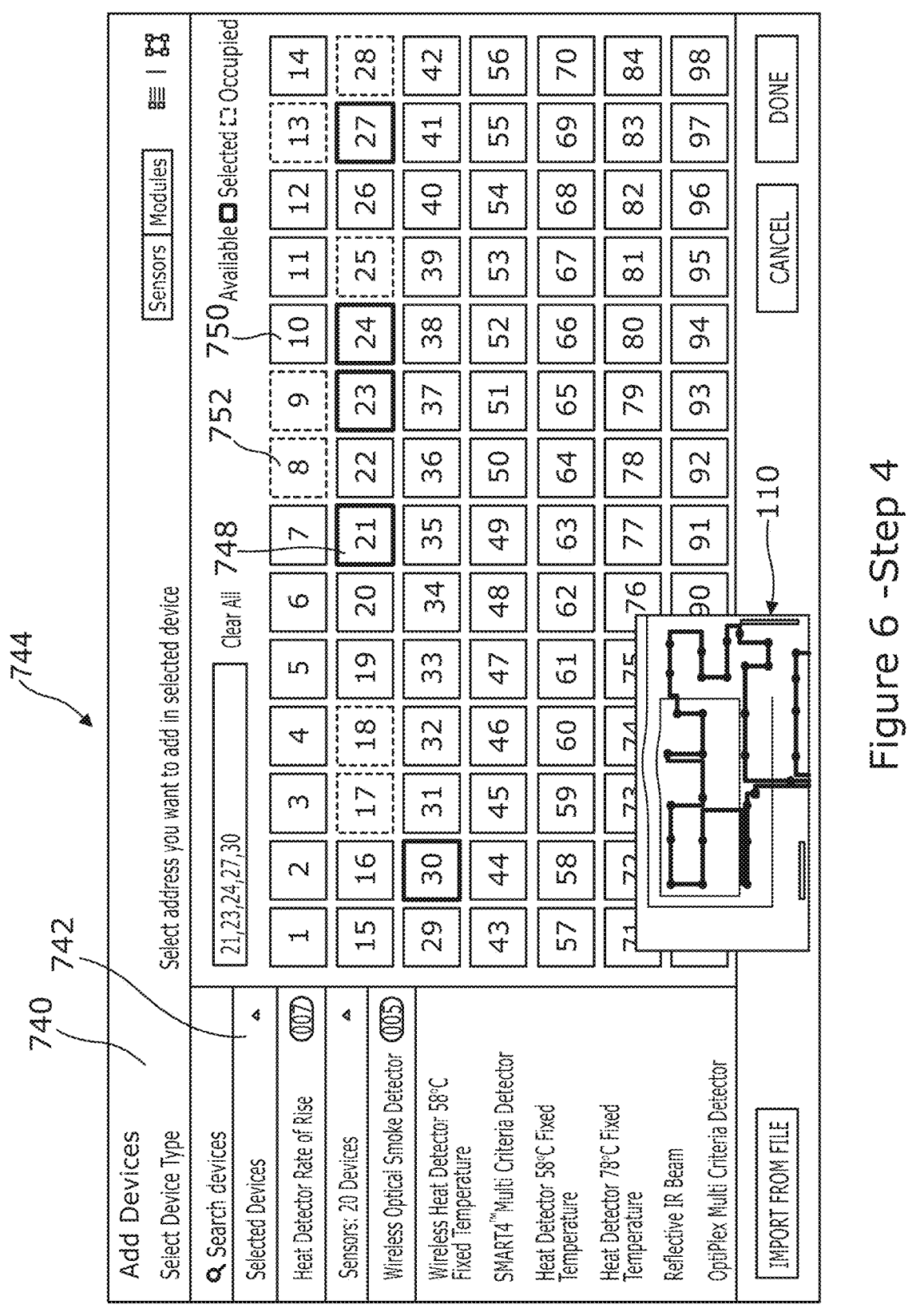
Figure 7:
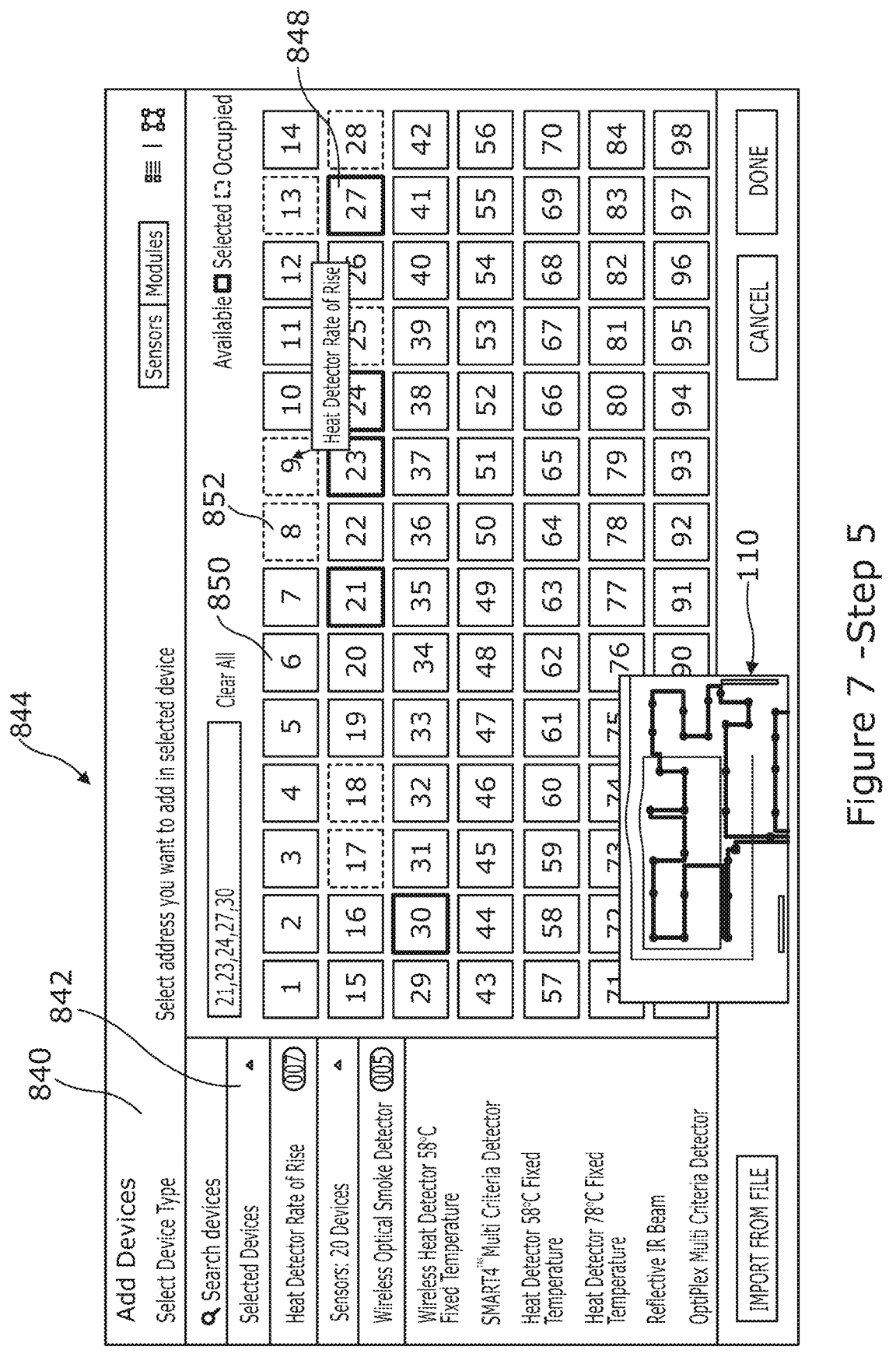
Figure 8:
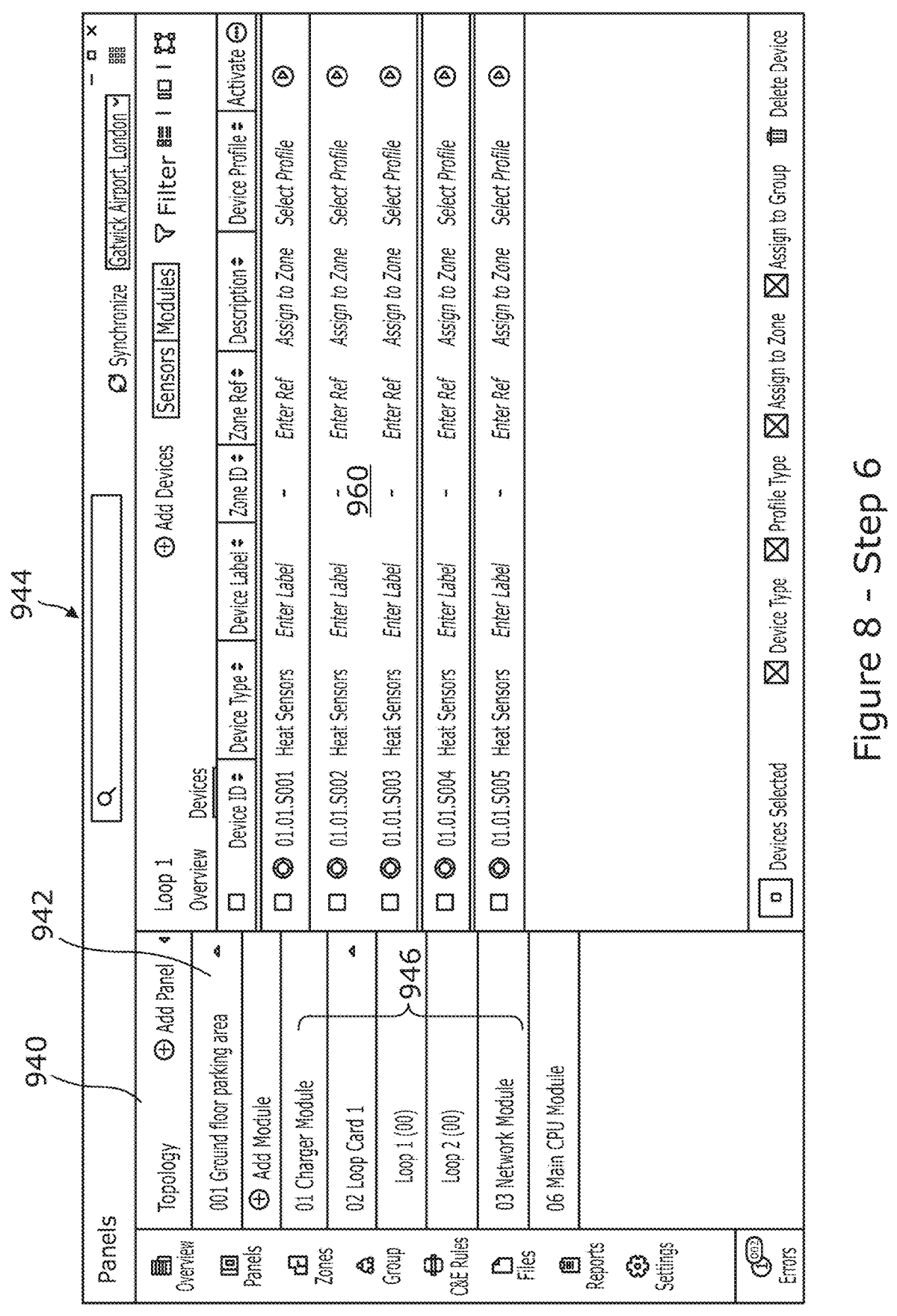
Figure 9:
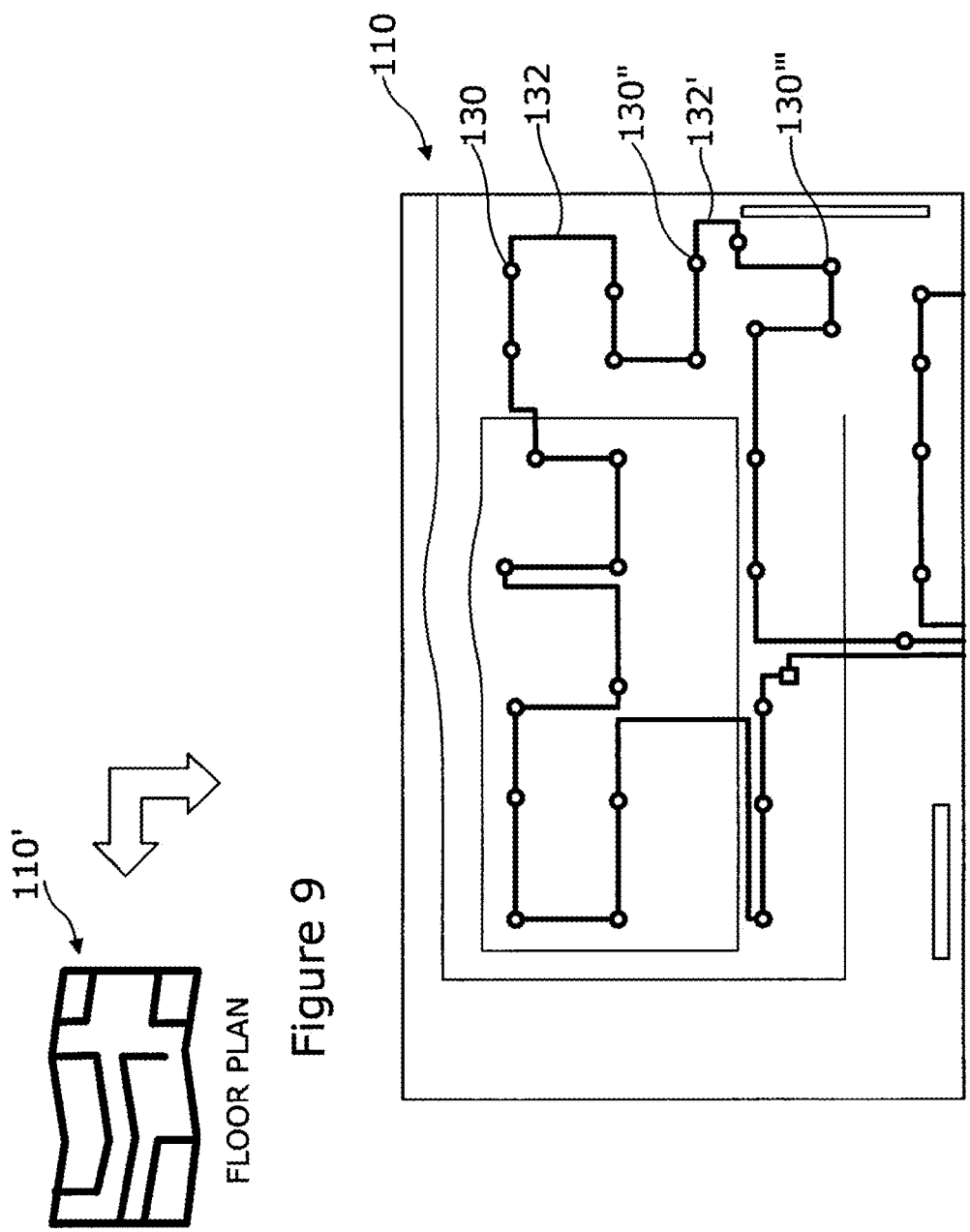
Figure 10:
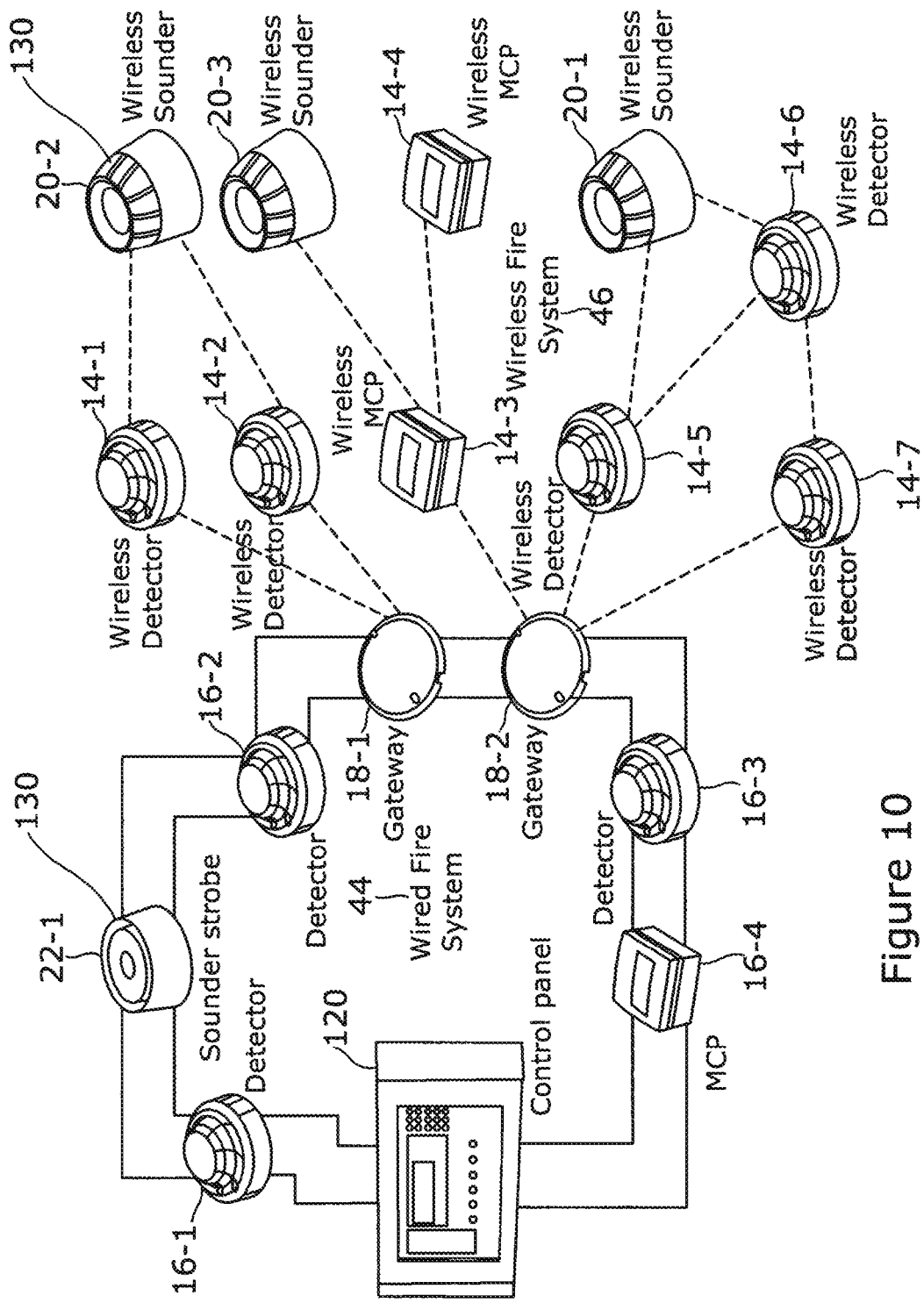

FIGS. 3 through 8 of the drawings illustrate a method of operation of the present invention this comprising;

FIG. 3—Step 1 selecting a Fire loop to add the required Sensors/Modules;

FIG. 4—Step 2 identifying Sensor/Modules type to be added to the Fire system network;

FIG. 5—Step 3 assigning the desired Device address to the particular Sensor/Module from the list of available device addresses displayed in the Device Address assignment window;

FIG. 6—Step 4 repeating step 3 for the devices;

FIG. 7—Step 5 illustrating grayed addresses in the display to indicate the addresses that are occupied;

FIG. 8—Step 6 a final list of device details along with the Device address is displayed for the user reference;

FIG. 9—shows a schematic plan, such as derived from a BIM and a user generated map, an electronic version of which is preferably displayed on the graphical user interface; and FIG. 10—shows a schematic of the system topology in terms of interconnections between devices and the central monitoring panel.

In the drawings of the present invention the following features are present:

100—System schematic;
110—Plan of region/building floor plan document/plan/ digital/physical building floor plan/fire device floor plan;
110'—Schematic plan of region such as BIM file;
120—Control Panel/panel/fire panel;
122—Graphical interface in control panel;
130—Device/peripheral device/fire device/sensor/module;
130'—Collection of example devices, for a fire alarm system, with device names/functions suitable for providing addresses and being allocated panel addresses as connected on a wired loop 44 or a wireless gateway 18;
132—Portion of loop connecting devices to central monitoring panel;
140—Graphical user interface, of the mobile type, such as laptop or tablet type; for communicating with (preferably being in sync(ronisation) with) the control panel;
142—Graphical interface, of the mobile type, mobile phone; for communicating with (preferably being in sync(ronisation) with) the control panel;
144—interactive screen of graphical user interface showing information describing the system components and their associations from which a user can select associations of devices, with addresses and plan locations on system commissioning for activating the devices to provide a functioning alarm system.
244, 344, 444, 644, 744, 844 and 944 show the interactive screen of graphical user interface showing at different stages of the activation/commissioning process.
240—list of generic categories of devices detected by the central monitoring panel;
242—generic categories of devices from which a user can select for displaying their addresses and status on the main portion of the interface so as to identify which addresses are associated with devices in that category;
246—further selector to swap between lists 240 of generic categories of devices, such as between sensor devices and output devices, which can be termed modules.
248—Highlighted addresses of sensors which have been allocated to a device type category 640 and are available to be allocated (activated) to individual devices on the plan—essentially as 648, 748 in their respective screens;
250—available addresses of sensors which can be allocated to a device type category 240.
340—list of system, topology attached to the central monitoring panel;
342—sub system indicating identify of region in which more specific element of system topology are located;
346—specific elements of system topology, such as loops or gateways on which individual devices are located;
440—list of generic categories of devices detected by the central monitoring panel; the associated screen not showing any devices selected;
442—generic categories of devices from which a user can select for displaying their addresses and status on the main portion of the interface so as to identify which addresses are associated with devices in that category; as 242 but for a different device;
450—available addresses of sensors which can be allocated to the selected device type category 440;
510—plan co-displayed in the graphical user interface, the plan showing geographic device locations; a full screen rendition being shown as 110 in FIG. 9;
520—the route of wiring for a given loop of the system to which devices 530 (=130 =130') are attached in the plan of the region;
530—devices on a loop of the system;
640—list of generic categories of devices detected by the central monitoring panel (equivalent to 240, 740 and 840 on their respective screens at different points of the commissioning process).
642—generic categories of devices from which a user can select for displaying their addresses
648—Highlighted addresses of sensors which have been allocated to a device type category 640 and are available to be allocated (activated) to individual devices on the plan;
650—available addresses of sensors which can be allocated to the selected device type category;
742—generic categories of devices from which a user can select for displaying their addresses;
748—Highlighted addresses of sensors which have been allocated to a device type category 740 and are available to be allocated (activated) to individual devices on the plan;
750—available addresses of sensors which can be allocated to the selected device type category;
752—Greyed out addresses of sensors which have been allocated to a device type category 240 and are blocked from being selected again whilst the allocation remains in place;
840 through 848—directly analogous to the equivalent 7XX series features;
940 through 946—directly analogous to the equivalent 3XX series features;
960—summary of information of activated devices on commissioned system resulting from steps 1 through 5.

The system end product achieved more rapidly and with fewer errors than if the system of the present invention is not employed on commissioning an alarm system as otherwise know in the art.

Figure 1:
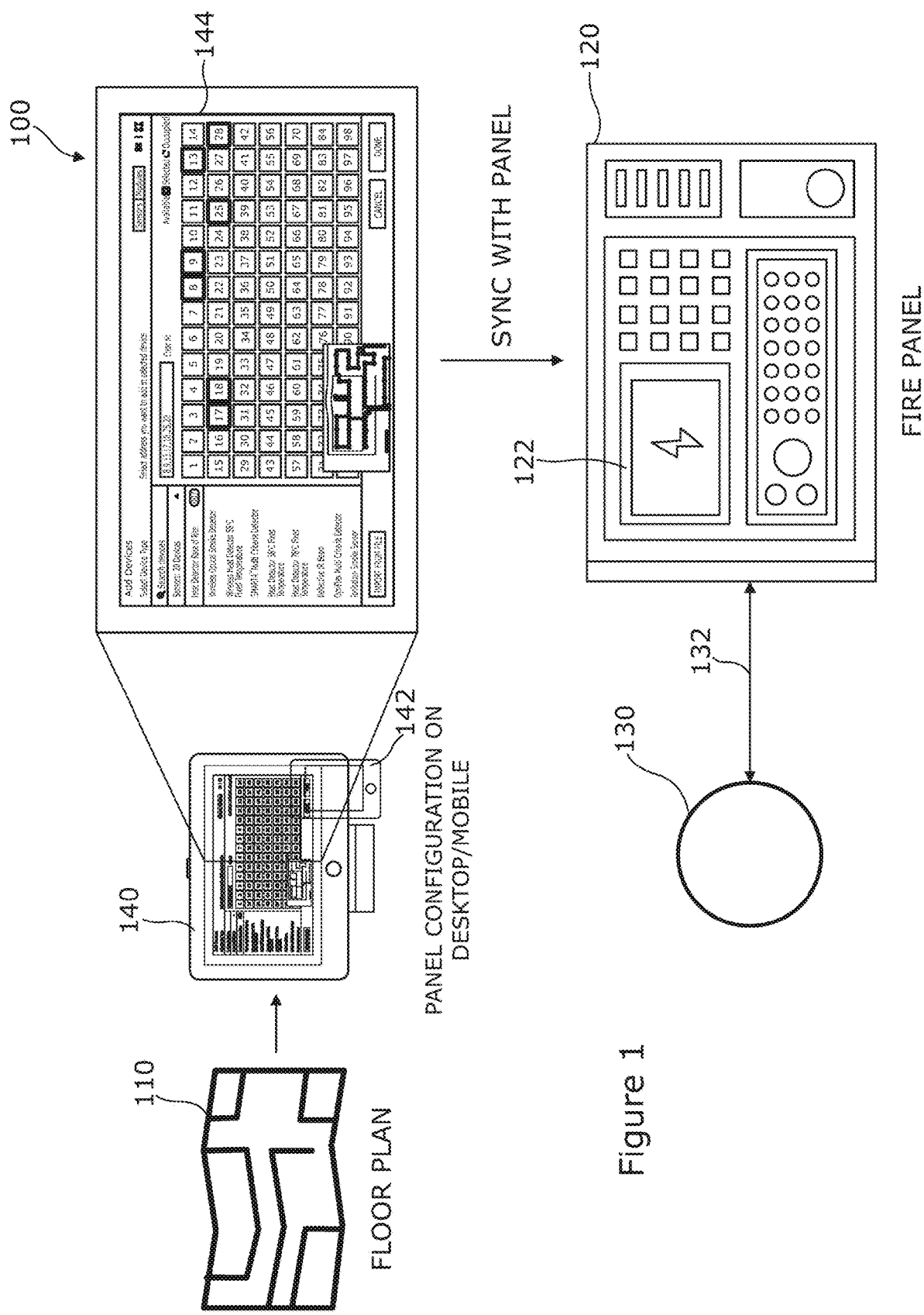
FIG. 1 shows an overview of the system of the present invention for carrying out the method of the present invention.

Referring now to the figures:

FIG. 1 shows an overview of the system of the present invention for carrying out the method of the present invention; in which a system schematic 100 is presented. The schematic shows the key elements of the alarm system of the present invention. The main physical components of the invention are a central monitoring panel 120 which is connected to one or more devices 130 by means of a wired 132 and/or wireless connection in a conventional manner such that the inputs and outputs of the devices 130 are in communication with the central control panel 120 so as to operate in the conventional manner of an alarm system. The schematic shows only a single device 130 but the benefits of the invention are most evident when a plurality of devices are present, such as 8 or more devices. The central control panel 120 comprises a graphical interface 122 for providing information. Either this graphical interface or, preferably an external graphical interface 140 in the form of a portable computer such as a laptop, tablet or mobile phone 142 is provided. The central control panel 120 comprises processing means for processing signals and information of the system and when preferably connected to the additional graphical user interface 140 that interface will also comprise processing means for processing the organisational setup of the alarm system. The organisational setup of the alarm system is made during the commissioning phase of the alarm system and this serves to associate the individual sources of information in the system into a coherent pattern of information for effective use of the alarm system information, such as in the triggering of an alarm. The key elements of the commissioning are the availability of a plan, such as a floor plan 110' which shows the location of the devices 130 and any relevant wiring 132 which indicates which loops or wireless networks the devices are connected to. The plan also preferably comprises information as to the type of devices, such as smoke detecors, and also preferably comprises address information of the devices 130. For example, the device may comprise a multidigit address. Such addresses have limited semantic content of use to a human user is associating these addresses with functions in the control panel 120 so that they may be activated, i.e. the control panel recognises and communicates with them in a meaningful way according to their function and that the control panel, as part of the commissioning process, and the key functionality of the present invention allocates to these devices 130 designations, such as a one or two digit decimal number (248, 648, 748) to enable them to be more easily identified and optionally allows the user to provide alphanumeric descriptors of individual devices, such as 'control room smoke alarm'. This greatly reduces the cognitive burden on the user of the alarm system and avoids common problems such as mis-recognising the meaning of signals in the system. The system of the present invention also does not permit multiple uses of the same address for a given part of the system topology. This avoids the time-consuming problem of resolving duplicate addressing and the possible danger and confusion of a device status indicating an alarm condition in multiple locations if the fault is not discovered during commissioning.

In use, the commissioning engineer uses the graphical interface 140, 142 (or 122) and this interface has the appearance shown in the various figures, indicated in the schematic as class 144 and in the further figures as specific instances 244, 344, 444 et cetera. In a preferred embodiment of the invention the graphical interface is portable 140, separate from the central control panel 120 and this enables the commissioning engineer to walk round a region in which the alarm system is installed, the system is then configured so that when a device is activated, such as locally by the commissioning engineer, the associations present with status information coming from that address are illustrated in the graphical interface 140, 122. The graphical interface very preferably also comprises a digital representation of the plan 110 and from this the commissioning engineer can immediately see if the physical location surroundings corresponds to that of the plan and the type and number of devices present on the plan in that location and whether the device information being sent to the central control panel 120 is an association with the correct type of device 240, 242 and whether it has been activated in the system by being allocated a system device address 248. If not, that association can then be quickly and readily made. This is a great improvement on current systems where the commissioning engineer would normally be limited to the physical location of the central control panel 120 and would require a colleague to be present next to devices so as to activate them. This, along with the attendant communication problems, greatly increases the time and effort required in the commissioning process and increases the likelihood of double address faults and overlooked devices. The system also provides a much-enhanced opportunity for the commissioning engineer to provide a meaningful description of a given device 130 in the alarm system 100. Since the commissioning engineer could be standing in, say, a conference room, have activated a device and seen that device highlighted in the graphical user interface, the commissioning engineer can then allocate an address and therefore activate that device as a functional part of the system but at the same time can give it a meaningful descriptor, such as 'heat alarm, central ceiling position in conference room' or other alphanumeric text. This rapidly identifies errors in the original plan 110, changes in the originally planned location of devices 120 made during installation and thus enables capture of subjective information which only the commissioning engineer would readily be able to identify from their experience in the system this greatly facilitates the capture this information such that in further system use and maintenance a large amount of time can be saved by knowing the correct descriptors and locations of devices. Whilst this can also be achieved manually without the present system it would take far more time and effort and be more prone to mistakes. As will be understood, the use of a mobile graphical interface 140/142 clearly benefits from the preferred presence of location measuring equipment, such as GPS et cetera as part of the interface 140/142 and associated software so as to indicate on the plan 110 where that device is located at a given time. Thus, if the mobile graphical interface 140/142 depicts on a plan 110, 510 the assumed location of the commissioning engineer in a first room but highlighting activation of an activated device in a second room, then it is immediately evident the device address has not been correctly assigned. The address can be reassigned to the room in which the commissioning engineer has prompted the device 130 to communicate with the central control panel 120.

The process of device Address Assignment can be better understood with reference to the following information regarding the screen display shown in FIGS. 2 through 8. These figures refer to a fire panel and a fire alarm system but it will be understood that the principles can be applicable to other alarm system types, such as a security alarm system.

Upon selecting a particular Loop in a control panel 120 such as in the form of a Fire Panel in the Configuration tool (i.e. the method of commissioning), with interface 144 (otherwise the system of the present invention), the tool automatically displays an Intuitive Address Assignment Window (244) that contains a list of available (250)/occupied (248) device addresses that can be assigned to a particular set of Fire Devices (242). The commissioning engineer may then assign the desired addresses to the corresponding fire devices on the Configuration tool by manually reviewing a physical plan, such as a paper map, by reviewing an electronic BIM or preferably by being physically present in a given location and having the plan shown on the graphical user interface with the geographic location of the device 140 shown on that plan.

The convention shown on the system 100, with interface 144 displayed on graphical interface 128/140/142 is that: the device addresses highlighted in Gray (252) signifies device address is Unavailable/Occupied:

the device addresses highlighted in Blue (darker grey in the figure, 248) indicates the Selected address for the current fire device (130) (Sensor/Module): and the device addresses with no highlight (250) indicates Available addresses, i.e. addresses which may be allocated to a given device so as to activate the device in the system, that is to bring the device into functional communication with other parts of the system, such as linking its output to a requirement to initiate an alarm siren or notify a remote-control room or user of an alarm.

During use of the system, the commissioning engineer (i.e. the system user) has an option to change the address associated with a fire device by de-selecting the assigned address and re-selecting a different available device address. The commissioning engineer has an option to provide additional information (for example label information) preferably in the form of an alphanumeric string for the fire device. A group of devices detected can be assigned to a particular zone as per the commissioning engineer choice. Zones are selected from topological elements of the system. That is the devices highlighted are assigned to a part of the system topology as illustrated in FIG. 3. The process is repeatable, and is preferably repeated, until each of the devices on the Fire device floor plan is assigned with a Device address (248).

FIG. 2 shows an example interactive screen 144 of the graphical interface 122 of the control panel 120 and/or preferably the mobile device graphical interface 140/142 140 used in the present invention for identifying devices; alarm systems are complex and typically installation is preplanned and the number of loops and devices is known ahead of time so that a system topology is already made available to the commissioning engineer from the notes of the installation engineer (who could be the same person). Hence, the first step, Step 1 FIG. 3 is:

Download Panel Configuration information such as assembled by an installation engineer to the Fire Panel. The Panel Configuration software (i.e. software to carry out the method of the invention) can download the Panel configuration information (.cfg or .bin file) to the Fire Panel using ISOM/Proprietary protocols. Similarly, the communication protocol, such as an established Wi-Fi interface to interface between the central control panel 120 and an external mobile graphical user interface device 140/142 will be set up in the conventional manner.

A method of Operation of the present invention provides an initial "Add Devices" screen of the interactive screen of the graphical user interface is shown in FIG. 4. The interactive screen 444 shows device type options, such as sensors or modules which can be chosen between, and for a given device type, (shown in this example as "sensors"), a list 440 of the relevant devices is provided, each device being listed by name 442. The main part of the screen shows available device addresses 450, and the plan 110 is shown in a sub-window, preferably overlaid on the main screen, which shows the positions of the devices 530 and their interconnections 520. The commissioning engineer can therefore readily associate a given device on a given loop (selected separately in FIG. 3) with a given address 450 so as to activate the device 530 in the system and to preferably provide a descriptor for the device. The disparate pieces of information of the geographic location, type of device, and device address in the central monitoring panel 120 are therefore readily associated thus saving much time and effort for the commissioning engineer. In a preferable feature of the invention a device 530 is activated by the engineer in possession of a portable graphical interface 140/142, which communicates its position to the system 100, and the system 100 displays the position on the plan 510. In conjunction with this the user, such as the commissioning engineer then has the capability of activating a given device, such as a smoke alarm. This will serve to highlight or otherwise identify the type of device 442 to the system and, if it has been activated, the address of the device 248. Importantly if not activated then the commissioning engineer can readily cross-reference information and/or establish an activation for the device by using the interactive screen 144 of the graphical user interface 122 (where the highlight of the device may be displayed), or preferably its mobile equivalent 140/142 (where the highlight of the device may be displayed), and which provides user communication with the central control panel 120. After commissioning, the graphical user interface if a separate mobile entity (rather than 120) will normally be decoupled from the central monitoring panel 120, and the alarm system configuration achieved by the system of the present invention 100 will then be resident in the alarm system for future use—i.e. the system would have been commissioned.

Referring now to FIGS. 3 through 8 these show steps in use of the interactive screen 144 of the graphical user interface.

Step 1 is shown in FIG. 3.

FIG. 3 shows a system "Topology" 340 interactive screen 344 which is typically pre-populated by the installation engineer with information as to the region protected by a given part 342 of the system and has its actual connection format or a list of available connection formats 346 from which the commissioning engineer can then activate devices. In this instance the Commissioning Engineer selects a Fire loop to add the required Sensors/Modules and clicks Add Device button so as to move to the screen shown in FIG. 4.

Step 2 is shown in FIG. 4.

The commissioning engineer clicks on the Sensor/Modules device type to be added to the Fire system network (ex: Heat Detector Rate of Rise) by referring to the digital/physical Fire system network floor plan 110, 110' with Device type, address and label information marked on it. This association may involve the GPS positioning mentioned previously, which may be carried out by the commissioning engineer as facilitated by the compilation information, as mentioned above, provided by the system on the interactive screen 144.

Step 3 is shown in FIG. 5.

Based on the floor plan 110 the commissioning engineer assigns the desired Device address 648 (c.f. 248 etc.) to the particular Sensor/Module from the list of available device addresses (450, 650) displayed in the Device Address Assignment window 644 by clicking on the available addresses 650. Upon selection the device address is highlighted in Blue 648 to indicate the Device address selection, the system then activating the device by incorporating this association into the functioning of the alarm system so that the device may carry out its normal function, such as signaling smoke detection, in a normal manner of an alarm system.

Step 4 is shown in FIG. 6.

The device address assignment is repeated in a fresh screen 744 in a reiteration of a previous screen, such as 244, both being developments of a clean initial screen 444. The assignment is repeated for other Sensors or Modules which are devices 130 of the system. In each iteration the type of device sensor/module 740 is selected and from these the device type 742 is selected and individual available devices, (here the wireless optical smoke detector type) is selected.

These options are preferably supplied by the Fire Control panel software and made available 742 to be queried using the configuration tool. They may be pre-populated by the installation engineer, or simply the list of possible options are presented in a further list 742.

Step 5 is shown in FIG. 7.

The grayed addresses in FIG. 7 indicate the addresses that are occupied (i.e. assigned to other devices). The selections will have been made in previous iterations of the commissioning process, such as shown in FIG. 6. The Commissioning Engineer can hover on the Grayed address items for more information, this additional information is preferably the alphanumeric descriptors mentioned previously which provide meaningful information to a human user.

Step 6 is shown in FIG. 8.

The Commissioning Engineer selects the command button "Done" to finish the Device address assignment process. The final list of device details along with the Device addresses is displayed for the user's reference.

The system and method of the present invention provides Intuitive Address Assignment by means of the interactive screen of the graphical user interface to quickly assign the desired addresses to a set of devices on a loop. Based on this information the Commissioning Engineer can quickly commission an entire Zone/Area (i.e. parts of the topology, such as loops and radio systems) in a building in a matter of minutes, thereby providing a quicker way to commission a site which otherwise would have taken hours/days.

Further, the system and method of the present invention eliminates the situations leading to a duplicate address being assigned to a fire device (Double Address Faults) as the tool (the interactive screen the graphical user interface) displays only those addresses which are available to be assigned in the fire network system. This also prevents a single address from being assigned to two different devices.

FIG. 9 shows a schematic plan 110', such as derived from a building information model (BIM model), and a user generated map 110, an electronic version of which 510 is preferably displayed on the graphical user interface. The plan 110, which can be reduced to a schematic 110' for easier display, comprises the location in the region of the alarm system of the devices 130, 130", 130''' and the interconnections 132, 132', so that the commissioning engineer can understand the topology of the system, for example specifically which loop a given device is connected to. This facilitates the allocation of device addresses in the activation steps, and the generation of meaningful alphanumeric identifiers for given devices. In a preferred feature of the present invention, on activation of a given device 130 the plan in electronic form highlights that device, for example by turning the depiction of the device from one form of an icon to another, such as from a black circle to a flashing red dot. In a preferred feature of the present invention, the current physical location of the mobile device 140 of the graphical user interface 140/142 is also depicted on the plan 110, 510 by means of a suitable icon, such as an icon of a person meant to represent the commissioning engineer holding the graphical user interface 142 (or 140).

FIG. 10 shows a schematic of the system topology in terms of interconnections between devices and the central monitoring panel. This schematic is what is represented in the plan 110, 510 in terms of a specific geographical location in a region of space, such as inside a building. This shows the connection format of communications between the devices 16-X, 18-X, 22-X (X being a single digit), the communications being in the form of a conventional wire loop (left-hand side) connected to the central monitoring panel 120 and/or wireless devices 14-X, 20-X, which is identified in the relevant interactive screen 344, 944 of the system by means of topology descriptors 346 describing the connection format.

More specifically, FIG. 10 is a simplified block diagram of a security system or more particularly a fire detection system 130' relevant for the interactive screen 144 and other parts of the illustrated system 100 and in which the device(s) 130 of FIG. 1 are shown in expanded form in 130'. Included within the system may be a number of fire sensor devices 14, 16 used to detect threats such as from fire within the region. The fire input devices may be scattered throughout the secured area and may each include a fire detector that operates to detect fire by sensing any one or more of a number of different fire-related parameters (e.g., smoke, carbon monoxide, heat, etc.) and a manual call point. The fire system may also include a number of different warning devices 20, 22 intended to be activated in the event of fire to warn people within the secured area. The warning devices may be any type of audio and/or visual device that attracts attention and announces the existence of a fire. All these types of devices are intended to be used in the system of the present invention, by activating these devices within the alarm system central monitoring panel 120. For completeness, where output devices are present in the system of the present invention, a feature is provided in the interactive screen by which the user can activate it, such as to briefly sound an alarm, so that the commissioning engineer can both check that the alarm is functioning and also activate it within the system and preferably give it a meaningful alphanumeric descriptor.

Included within the control monitoring panel 120 may be one or more processor apparatus (processors), each operating under control of one or more computer programs loaded from a non-transient computer readable medium (memory) 32. As used herein, reference to a step performed by a computer program is also reference to the processor that executed that step. In this regard, an alarm processor within the control panel may monitor a status of each of the input devices. Upon detecting activation of any of the inputs, the alarm processor may activate one or more of the warning devices and send an alarm message to the central monitoring station.

In this regard, the gateways 18 may operate to translate device coding (e.g., addresses) from a radio frequency (RF) protocol used within the radio domain to a loop protocol that, in turn, incorporates communication loop addresses recognized by the control panel on the communication loop. In this regard, the protocol used by the mesh network may be based upon any of a number of different RF protocols (e.g., the Cascading Wave Communication protocol developed by Honeywell, Inc.). Such a mesh forms a communication network based upon a series of parent/child relationships. The basic network element is called a node and the network root element (node 0) is referred to as the gateway or master node 18. Each node can be connected to geographically adjacent nodes via full duplex links, so that each device is able to manage communications in the direction of both network boundaries (e.g., from its children to the root and vice versa).

A particular advantage of the present invention is that since in a wireless system the physical location of devices 130 may not be immediately evident, for example an installation engineer may have accidentally swapped over the position of two devices of the same type, for example the only difference between two devices being a multidigit identifier in a communications header on installation compared to what is presented in a the plan. The present invention readily allows the correct addressing and hence correct activation in the system of a given device 130 even were wireless communication removes a physical link between the device 113 and the control panel 120, hence, the ability for the system to allow the graphical user interface 140/142 to roam within the region, activate devices, see them highlighted on the plan 510 *o* the interfaces 144 means that the link between physical location and incoming signal; to the system can be readily correlated and a devices activated in the system carrying correct geographic identifiers information. This ability is preferably enabled throughout the system of the present invention by the user's mobile device 140 of the graphical user interface 140/142 being in radio communication with the central monitoring panel 120 for the purposes of communicating information described herein.

The present invention has been described by means of a number of figures and in these the numbering has been used in a systematic manner such that, for example, when referring to interactive screen 144 this implies that the similar interactive screens 244, 344 to X44 are also relevant. This should be borne in mind when only one of those references is used, when in fact in many instances a number of references have the same meaning as derived from context.

The invention claimed is:

1. An alarm system (100) installed in a region to be monitored, the alarm system comprising: a control panel (120),
   the system having a graphical interface (122,140,142) for displaying information,
   a plurality of devices (130, 130") in communication with the panel;
   the devices (130) being in a plurality of locations in the region;
   each of the devices (130) being identified by the central monitoring panel (120) by means of a device identifier,
   the panel (120) being configurable to communicate the status of one or more of the devices (130) for the purpose of providing alarm system functionality; and
   wherein the positions of the devices in the region are provided on a plan (110, 110', 510);
   characterised in that the graphical interface (122,140,142) is configured to provide an interactive screen (144), that screen providing:
   a display of the devices (130) in communication with the panel;
   the panel being further configured to enable a user to associate devices (130) with the positions of devices on the plan so as to activate the functionality of each device in the alarm system by allocating a respective unique system address to each respective device (130) using the interactive screen (144).

2. The system of claim 1 wherein the identity and address of any device that has been previously identified by the control panel and activated to operate with the control panel is no longer available and is shown as being no longer available for future activation by the user, such as by being greyed out in the interactive screen of the graphical interface.

3. The system of claim 1 wherein the interactive screen (144) provides lists of the types of devices available and the device addresses available and enables the user to associate devices with addresses using the interactive screen (144).

4. The system of claim 1 wherein the plan (110) is configured to be displayed on the graphical interface in conjunction with the interactive screen to enable a user to associate plan positions with device identifiers by interacting with the interactive screen.

5. The system of claim 1 wherein allocating unique system addresses to the respective devices (130) includes incorporating a link to the location of each device on the plan such that the status of activated devices is configured to be displayed on the plan to provide a user with a location in the region of the alarm system.

6. The system of claim 1 wherein the graphical interface (140. 142) is in radio communication with the control panel (120) and is equipped with a positioning system to identify the geographic position of the graphical interface mobile device in the region, and wherein the geographic position of the interface is displayed on the plan (110).

7. The system of claim 6 wherein the system (100) is configured such that when a user activates a device (130) of the system the position of the graphical interface is taken as the geographical position of the nearest device and the address communicated by that device to the control panel is taken as the address of the device at that geographical position.

8. The system of claim 7 wherein the user is prompted to confirm activation of the automatically detected device and to optionally input further device identifier information and/or topological associations of the device.

9. The system of claim 1 wherein the display of the devices (130) in communication with the control panel shows the communication status of the devices, such as on the plan (510) on the display.

10. A method of commissioning an alarm system (100) installed in a region according to a plan (110), the plan disclosing the geographic arrangement of devices (130) in the system (100) in communication with a control panel (120), the devices (130) being in a plurality of locations in the region;
   each of the devices (130) being identified by the control panel (120) by means of a device identifier, the system having a graphical interface (120,140,142) for displaying information, characterised in that the graphical interface (120,140,142) is configured to provide an interactive screen (144), that screen providing a user with the ability to execute the method steps using an interactive screen (144), the steps being:
   a) Identifying devices (130) in communication with the panel from a list of devices provided by the interactive screen (144);
   b) Associating the devices (130) with respective unique system addresses from a list of available addresses presented on the interactive screen (144) and thereby activating the functionality of the devices in the alarm system;
   c) Disabling those addresses from being associated with any further devices so that each address association is unique.

11. The method of commissioning the alarm system of claim 10, further comprising the step of:
   d) Providing system topology subdivisions on the interactive screen (144) such that for different topological subdivisions, such as system loops, device addresses can be duplicated whilst the device retains a system wide unique identifier.

12. The method of commissioning the alarm system of claim 10, wherein disabled addresses are shown on the interactive screen (144) and display details of the activated device to which they have been allocated when selected.

13. The method of commissioning an alarm system of claim 10, wherein the plan (110, 510) is displayed on the interactive screen (144) and the user can drag and drop a device icon from the plan to one of the available addresses on the interactive screen (144) to activate the device functionality in the system, to allocate the address to the device and to incorporate a link to the plan location with the address.

14. The method of commissioning an alarm system of claim 13, wherein the position of the graphical interface is shown on the plan (510) and any activation of a device at that location serves to automatically associate the activated device with a selected system address.

15. The method of commissioning an alarm system of claim 14, wherein a communication status of the activated device is depicted on the plan at the relevant location.

\* \* \* \* \*